M. E. TURNER.
HEN'S NEST.
APPLICATION FILED JUNE 28, 1917.
1,256,956.
Patented Feb. 19, 1918.
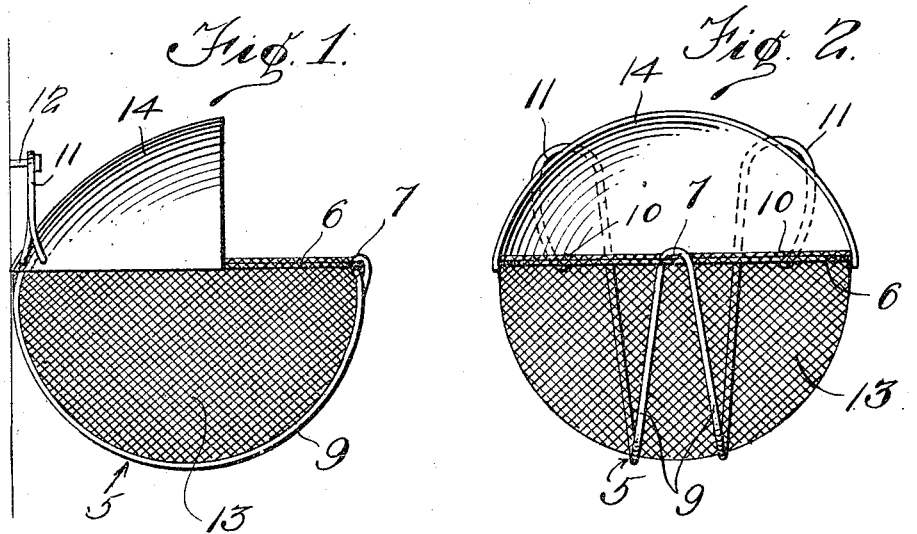
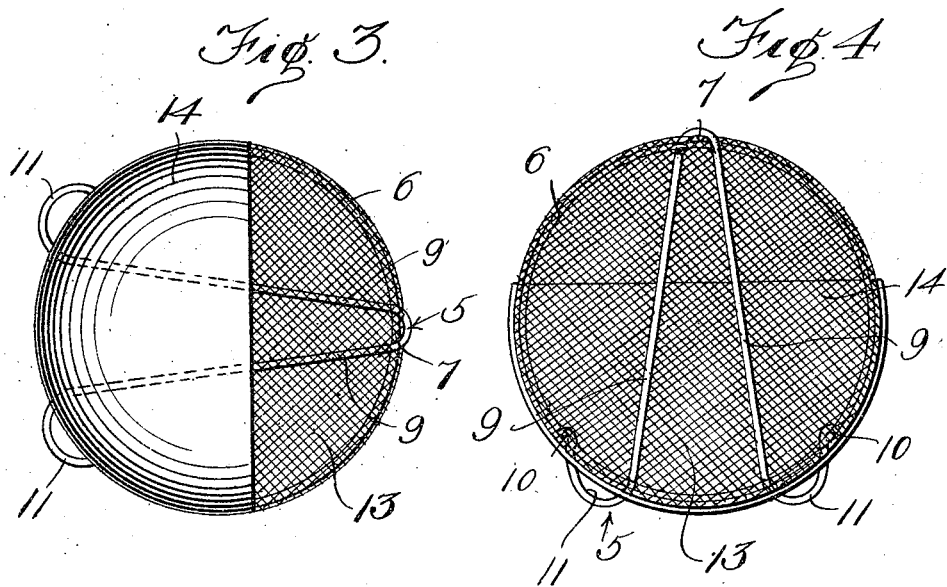
Witnesses
C. P. Hardy
C. C. Chandler
Inventor
M. E. Turner
By Chandler & Chandler
Attorneys

UNITED STATES PATENT OFFICE.

MABELLE E. TURNER, OF DEPOSIT, NEW YORK.

HEN'S NEST.

1,256,956.      Specification of Letters Patent.      Patented Feb. 19, 1918.

Application filed June 28, 1917. Serial No. 177,598.

*To all whom it may concern:*

Be it known that I, Mrs. MABELLE E. TURNER, a citizen of United States, residing at Deposit, in the county of Broome, State of New York, have invented certain new and useful Improvements in Hens' Nests; and I do hereby declare the following to be a full, clear, and exact description of the invention, such as will enable others skilled in the art to which it appertains to make and use the same.

This invention relates to improvements in hen's nests and has for an object to provide an article of this character which is of a simple and economical construction, is sanitary in the extreme, in that it affords no place for the collection of dust and dirt and no cracks or crevices to become infested with lice, mites and other vermin, and which may furthermore be quickly and conveniently installed.

With the above and other objects of similar nature in view the invention consists in the construction, combination and arrangement of parts, set forth in and falling within the scope of the appended claim.

In the drawing:—

Figure 1 is a side elevation of my improved nest illustrating its use.

Fig. 2 is a front elevation thereof.

Fig. 3 is a rear view, and

Fig. 4 is a bottom plan view.

Referring now more particularly to the accompanying drawing, there is shown a hen's nest which is of all metal construction and consists of a frame 5 including a strand of wire 6 substantially bent circularly to form the entrance opening of the nest.

A second strand of wire is bent upon itself as indicated at 7 around the wire 6 with resultant end portions 9 curvingly extended downwardly in divergent relation toward and beyond the opposite sides of the wire 6. The end portions 9 beyond the wire 6 are then rebent or doubled upon themselves and terminally connected at 10 to the wire 6, there thus resulting a pair of spaced loops 11 through the medium of which the nest may be suspended from nails 12 or other suitable means driven into the walls or other portions of the poultry house.

Disposed within the frame thus provided is a lining 13 of wire fabric, the same constituting the bottom of the nest and having its upper edge bent over the wire 6 and thus suitably secured.

There is also provided for the nest a top or cover 14 which is secured to and supported upon the wire 6 of the frame and partially overhangs the nest as is clearly shown in the drawing.

This nest is used in the manner of the usual nest boxes and a detail description is therefore not necessary. It will be readily seen however that by this construction an extremely simple, efficient and inexpensive nest is produced and one which is sanitary in the extreme, its all metal and open construction precluding the accumulation of dust, dirt and vermin.

What I claim is:

A hen's nest including a frame consisting of a wire substantially bent circularly to provide a nest opening, a second wire bent upon itself between its ends and around the first named wire, the resultant ends of the second wire diverging in a downward curve toward and beyond the opposite side of said first named wire and being rebent and connected to the latter whereby spaced suspending loops are formed, a fabric nest bottom mounted in the frame, and a cover secured to the frame and partially overhanging the nest opening.

In testimony whereof, I affix my signature in the presence of two witnesses.

MABELLE E. TURNER.

Witnesses:
    FLOYD B. SMITH,
    A. P. DAVIS.

*Copies of this patent may be obtained for five cents each, by addressing the "Commissioner of Patents, Washington, D. C."*